US010032303B2

(12) United States Patent
Naveh et al.

(10) Patent No.: US 10,032,303 B2
(45) Date of Patent: Jul. 24, 2018

(54) SCROLLING 3D PRESENTATION OF IMAGES

(71) Applicant: Facebook, Inc., Menlo Park, CA (US)

(72) Inventors: Barak R. Naveh, Palo Alto, CA (US); Georgios Karnas, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/715,608

(22) Filed: Dec. 14, 2012

(65) Prior Publication Data
US 2014/0168205 A1 Jun. 19, 2014

(51) Int. Cl.
G06T 3/00 (2006.01)
G06T 11/60 (2006.01)
G06T 9/40 (2006.01)
G06F 3/0485 (2013.01)
G06Q 50/00 (2012.01)
G06T 13/20 (2011.01)
G06T 19/20 (2011.01)

(52) U.S. Cl.
CPC .......... *G06T 13/20* (2013.01); *G06F 3/0485* (2013.01); *G06T 19/20* (2013.01); *G06T 2219/2016* (2013.01)

(58) Field of Classification Search
CPC .. G06F 3/0485; G06F 3/0481; G06F 3/04815; G06T 11/001; G06T 11/60; G06T 3/0093; G06K 9/32
USPC ....... 345/581, 619, 672, 676, 679, 680, 682, 345/684, 688; 382/293, 295, 305; 715/784, 786, 787, 799, 830, 835–838, 715/848, 850–852
See application file for complete search history.

(56) References Cited

U.S. PATENT DOCUMENTS

| | | | |
|---|---|---|---|
| 2002/0190989 A1* | 12/2002 | Kamata et al. | 345/440 |
| 2005/0192924 A1* | 9/2005 | Drucker et al. | 707/1 |
| 2009/0150775 A1* | 6/2009 | Miyazaki et al. | 715/702 |
| 2010/0277496 A1* | 11/2010 | Kawanishi | G06F 3/0485 345/589 |
| 2011/0157047 A1* | 6/2011 | Nakagawa | 345/173 |
| 2011/0173569 A1* | 7/2011 | Howes et al. | 715/835 |
| 2012/0117600 A1* | 5/2012 | Friedlander et al. | 725/41 |
| 2012/0158499 A1* | 6/2012 | Banadaki | G06Q 30/0254 705/14.52 |
| 2012/0213404 A1* | 8/2012 | Steiner | G06F 17/30256 382/103 |
| 2012/0254791 A1* | 10/2012 | Jackson et al. | 715/781 |
| 2013/0127838 A1* | 5/2013 | Derrig | G06T 15/00 345/419 |

* cited by examiner

Primary Examiner — Ke Xiao
Assistant Examiner — Andrew Shin
(74) Attorney, Agent, or Firm — Baker Botts L.L.P.

(57) ABSTRACT

Particular embodiments receive a request to display images in a scrolling 3D presentation. Images are retrieved according to selection criteria. The images may be sorted according to sorting criteria. Sponsored images may be inserted into the scrolling 3D presentation. The scrolling 3D presentation of images is provided for display on a computing device associated with a viewer. Images in the scrolling 3D presentation are rendered so as to sequentially approach the viewer according to a perspective of the viewer. Control requests related to the scrolling 3D presentation may be received from the viewer, from a social-networking system, or from a third-party server. A control interface may be provided for the viewer to submit control requests.

20 Claims, 9 Drawing Sheets

SCROLLING 3D PRESENTATION OF IMAGES

TECHNICAL FIELD

This disclosure generally relates to images, in particular, displaying a scrolling three-dimensional (3D) presentation of images.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users. The social-networking system may transmit over one or more networks content or messages related to its services to a mobile or other computing device of a user. A user may also install software applications on a mobile or other computing device of the user for accessing a user profile of the user and other data within the social-networking system.

SUMMARY OF PARTICULAR EMBODIMENTS

Particular embodiments display a scrolling 3D presentation of images. Individual still images and/or video clips are presented in a scrolling presentation with respect to the viewer's perspective. Each image becomes larger, less obscured, higher in resolution, and sharper in focus as it moves "forward" in the sequence of images in the scrolling 3D presentation, thereby appearing to approach the viewer. In particular embodiments, special effects may be applied to each image. In particular embodiments, a control interface may be provided for the viewer.

DESCRIPTION OF PARTICULAR EMBODIMENTS

FIGS. 1A-E each display a scrolling 3D presentation of images. Individual still images and/or video clips are presented in a scrolling 3D presentation with respect to the viewer's perspective as if moving through a virtual gallery. The scrolling 3D presentation may appear as one or more streams of images, where images in a stream appear to move toward or "approach" the viewer. Within the scope of this disclosure, the term "image" may refer to either a still image, a video clip, an animated image (e.g., GIF), or any other type of image. Video clips may either be represented by one or a few frames of the video, or the full video clip may be played as the presentation scrolls toward the user.

Figure 1A:
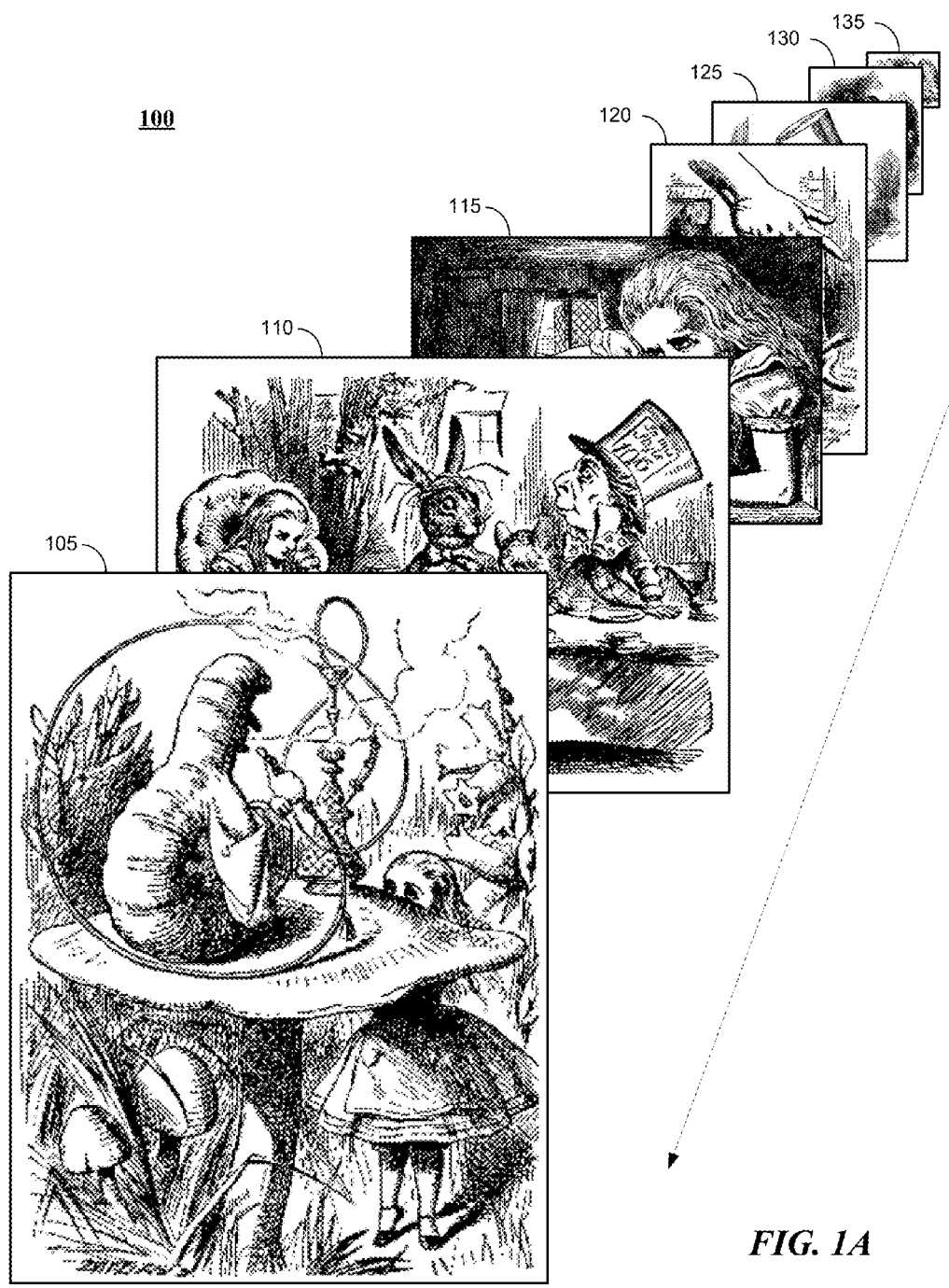
FIG. 1A-E are illustrations of example scrolling 3D presentations of images.
Figure 1B:
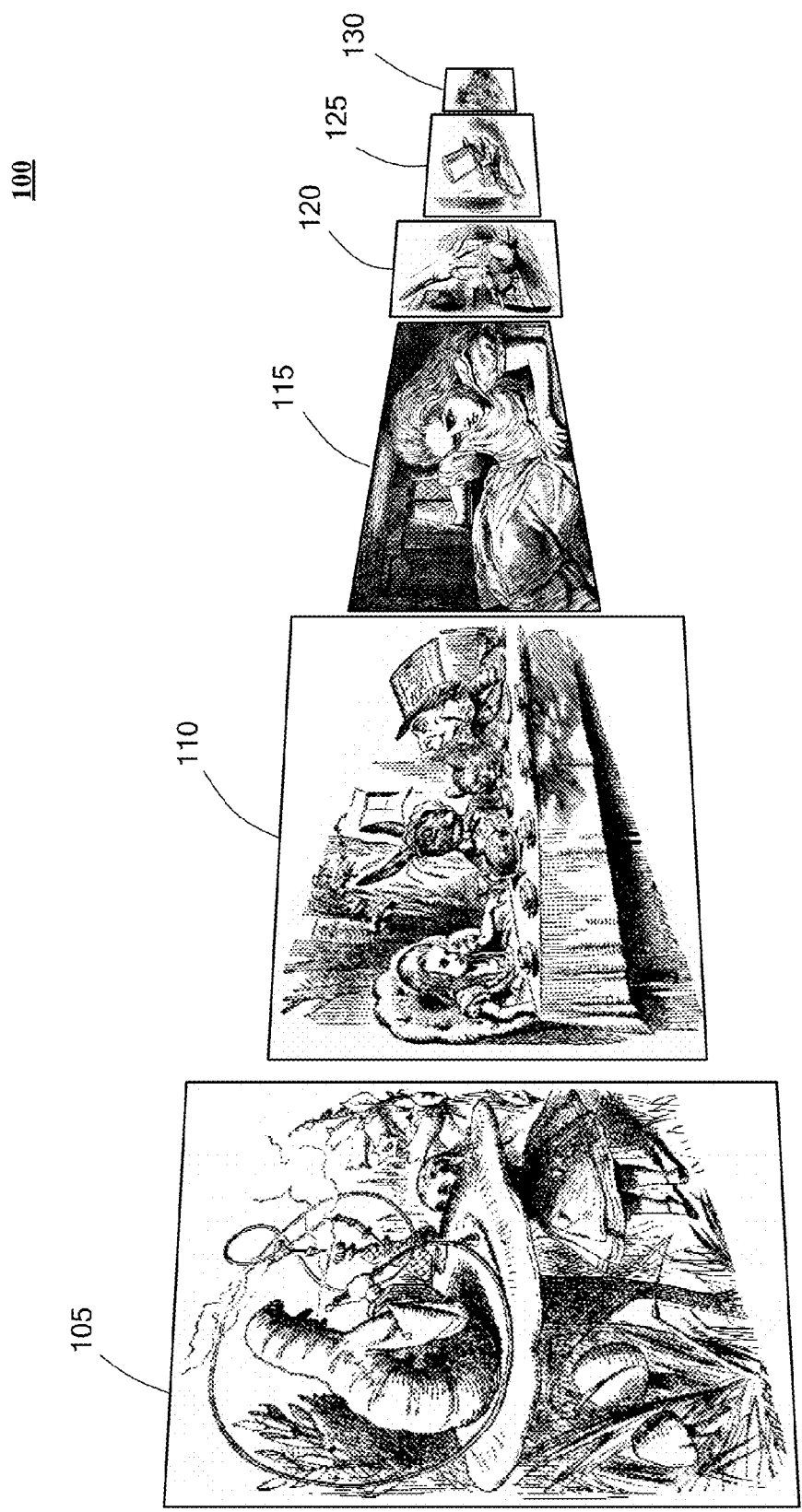

In the example scrolling 3D presentation shown in FIG. 1A, images 105-135 scroll towards the viewer in the direction of the arrow. Image 105 is "closest" to the viewer and therefore is displayed most clearly and prominently. Images 105-135 become successively larger in scale, higher in resolution, and increasingly less obscured as they approach the viewer. Although images 105-135 are shown as overlapping each other, this aspect is not essential to the invention—images 105-135 may be displayed in any manner that facilitates a scrolling 3D presentation of the images. Furthermore, although images 105-135 are shown as moving downwards and to the left as they approach the viewer, other directional movements may be used—FIG. 1A is intended merely to show one example way of presenting the images. As shown in the example illustration in FIG. 1B, images 105-135 scroll towards the viewer in the direction of the arrow (to the left), and images are displayed in perspective.

Each image in a scrolling 3D presentation of images may become larger, higher in resolution, more opaque, more saturated in color, less obscured, less distorted or skewed or stretched, and/or sharper in focus as it approaches the viewer. In particular embodiments, each image may be represented by a thumbnail or by a cropped portion of the image until it gets closer to the viewer and appears in full.

Figure 1C:
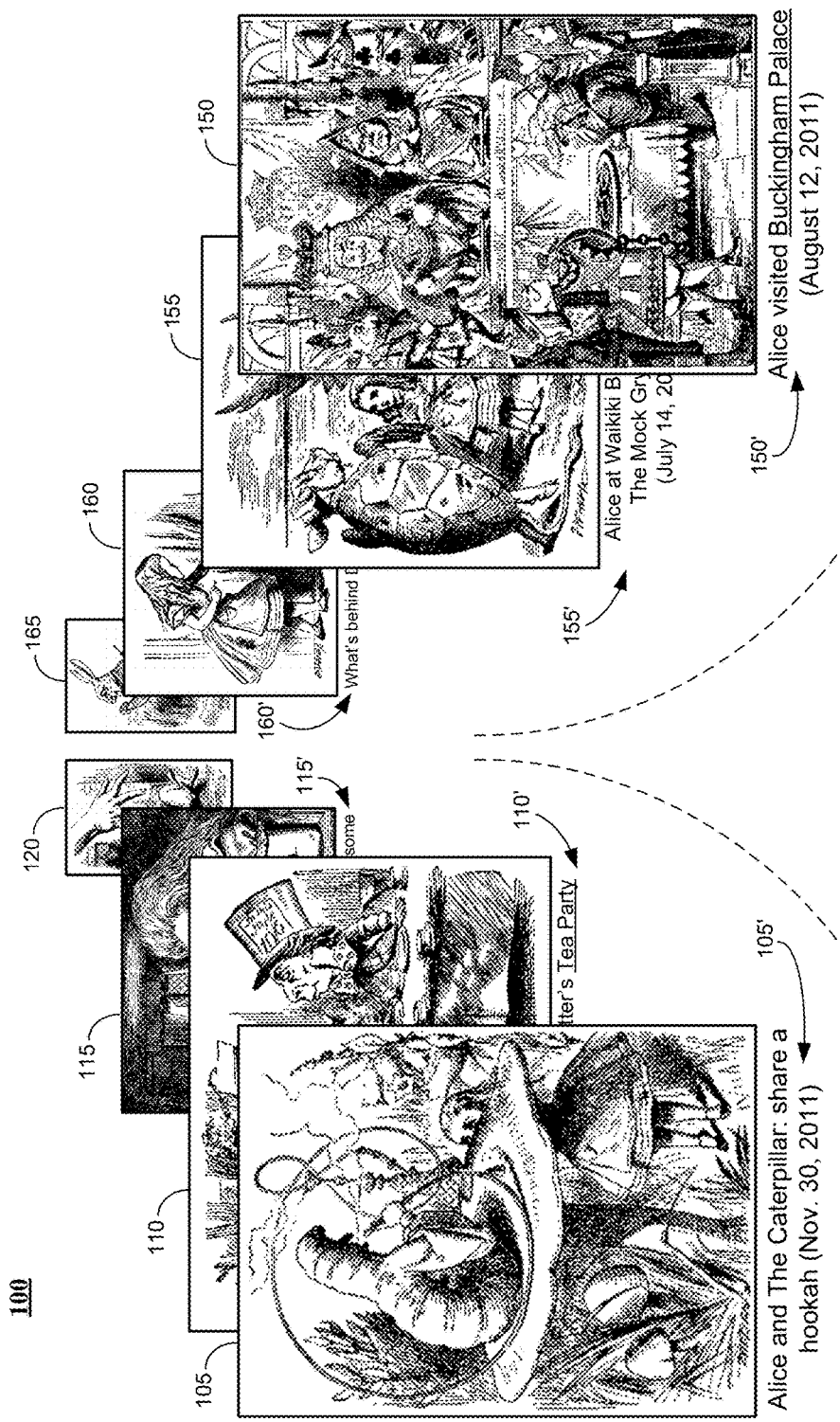
Figure 1D:
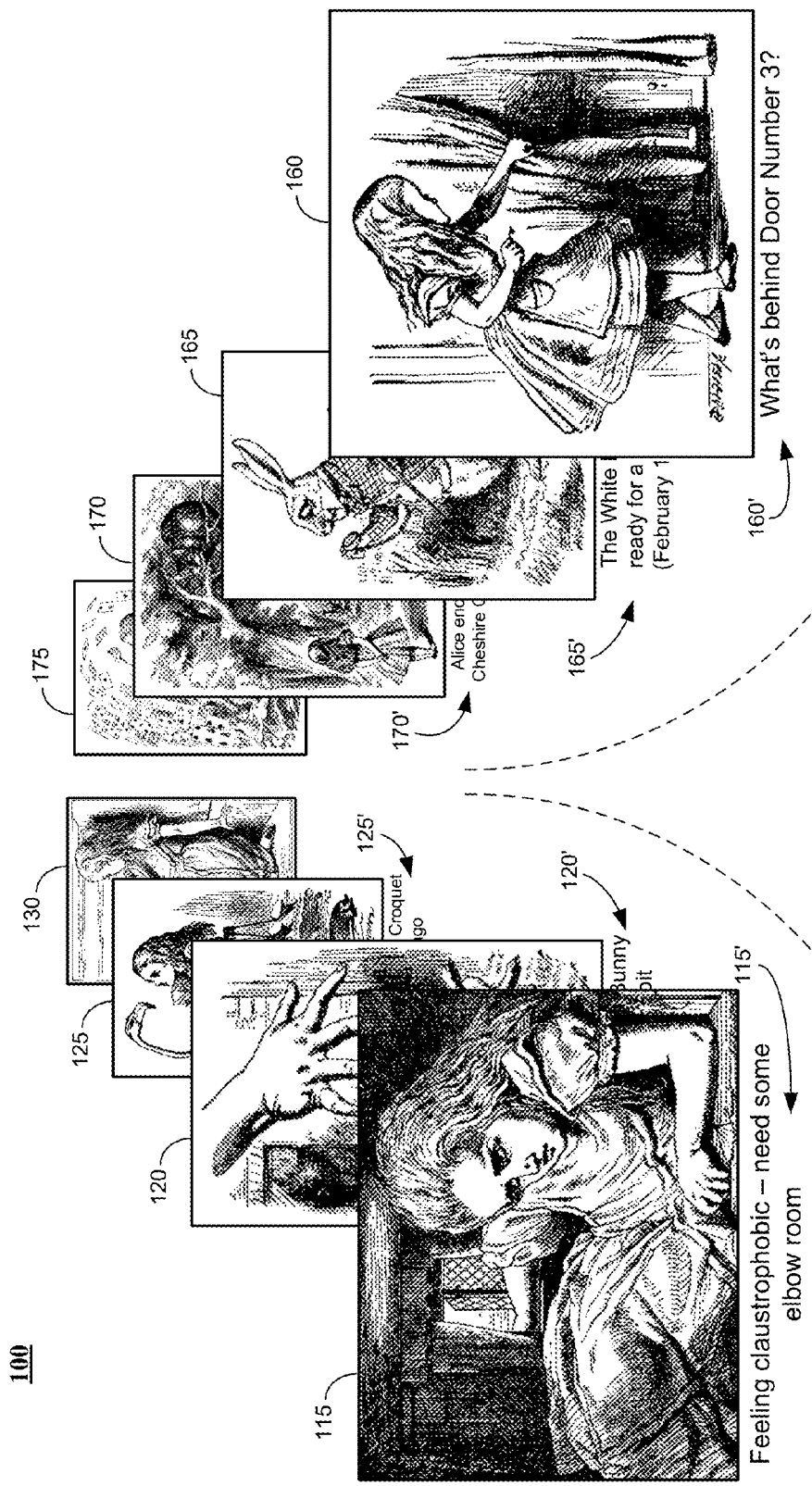
Figure 1E:
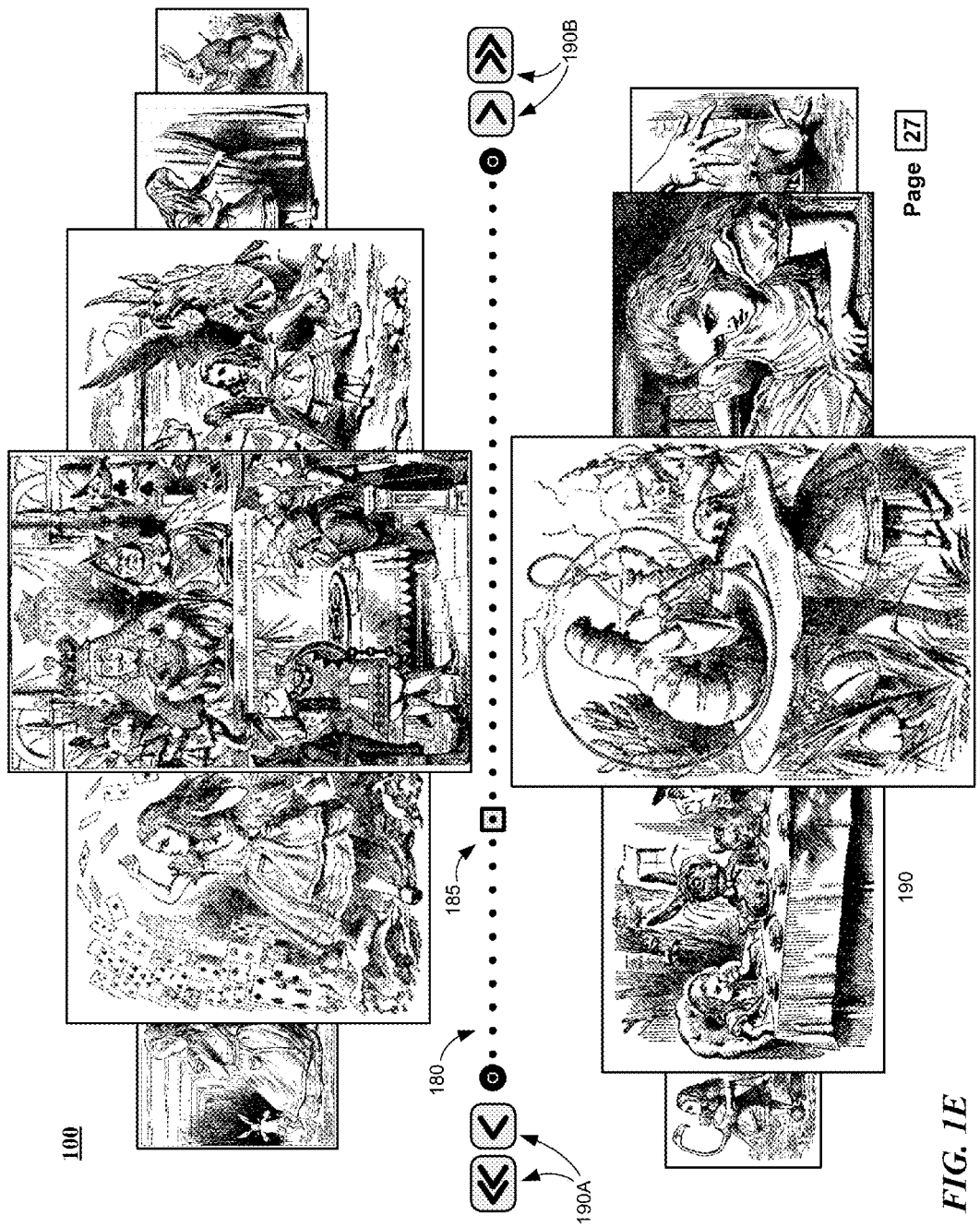

As shown in FIGS. 1C and 1D, in particular embodiments, the scrolling 3D presentation may comprise one or more streams of images. For example, in FIGS. 1C and 1D, two streams of images move downwards and towards the viewer. As the two streams of images scroll towards the viewer, those images at the front of the stream eventually disappear, and the next image moves forward. For example, as shown in a moment in time captured in FIG. 1C, image 105 appears at the front of the first stream comprising images 105-120, and image 150 and appears at the front of the first stream comprising images 150-165. As the two streams of images scroll forward, the moment in time captured in FIG. 1D is depicted, where image 115 appears at the front of the first stream comprising images 115-130, and image 160 appears at the front of the first stream comprising images 160-175. Presentation of multiple streams may be arranged in any manner that enables a scrolling 3D presentation of images. Another example presentation displaying two streams of images is shown in FIG. 1E.

Also, as shown in FIGS. 1C and 1D, images may appear accompanied by captions. For example, image 105 is accompanied by a caption 105': "Alice and The Caterpillar: enjoying a hookah (Nov. 30, 2011)," which appears below the image. Such captions may include other information associated with the image, such as date, time, location, identities of people appearing in the image, links to websites related to aspects of the image (e.g., a person's profile page, a product website, or another website).

In particular embodiments, the scrolling presentation may be displayed on a standard computing device or on a mobile device. Examples of computing devices are discussed in further detail with respect to FIG. 5.

In particular embodiments, special effects may be applied to all images in a scrolling 3D presentation or manually configured by the user for particular images. Such special effects may include, by way of example and not limitation: blurring, redaction, distortion, color adjustment, cartoon style, decorative frames, shadowbox appearance, a halo, thought balloons, speech balloons, or other images (e.g., mustaches, beards, devil horns, yellow round smiley faces, sparkles, or hearts). Such special effects may be applied to all images or applied as each image comes close enough to the viewer to move past the viewer's range of focus). In particular embodiments, special effects may be applied in accordance with attributes of an image or information associated with an image (e.g., creating a halo effect for images that include one's significant other or children). In particular embodiments, special effects may be applied in accordance with social-networking or social graph information, such as adding a special frame for images associated with a particular social-networking group.

In particular embodiments, the viewer can control the presentation, one or more streams of images in the presentation, or one or more images in a stream.

FIG. 1E illustrates an example set of controls for controlling a scrolling 3D presentation. In the example shown in FIG. 1E, a slider bar 180 and progress marker 185 may show the viewer progress through the two streams of images. By clicking anywhere on slider bar 180, the viewer may pause or resume scrolling. By clicking and dragging progress marker 185, the viewer may advance the presentation to a desired position on slider bar 180. By clicking on a particular image, the viewer may zoom in on the image and also be presented with an interface for editing the image itself or content or metadata associated with the image.

Controls 190A may enable the viewer to play or advance the presentation to the left; controls 190B may enable the viewer to play or advance the presentation to the right. In particular embodiments, a slider bar and controls may be provided separately for each stream in the scrolling 3D presentation. FIG. 1E merely illustrates one example of providing control functionality; particular embodiments may provide any type or combination of control functionality.

In particular embodiments, the viewer may be able to control the overall presentation, including one or more streams of images, such as, by way of example and not limitation: speed, number of streams, direction, style, orientation, angle, or pace (steady stream vs. leapfrogging). In particular embodiments involving a multi-stream presentation, the viewer may be able to configure particular settings differently for each stream.

In particular embodiments, the viewer may be able to control one or more streams of images, such as, by way of example and not limitation: pause, fast-forward/reverse (e.g., generally, or to particular moments in a timeline, or to or images that include particular people/places), repeat, shuffle, or individual images vs. a panel/stack of multiple images. In particular embodiments involving a multi-stream presentation, the viewer may be able to configure particular settings differently for each stream.

In particular embodiments, the viewer may be able to bookmark particular images/locations in the scrolling presentation, or to add annotations to a slider bar, timeline, sequence, index, table of contents, or other compendium associated with one or more streams of images.

In particular embodiments, the viewer may be able to control a particular image in a stream, such as, by way of example and not limitation: zoom in/out, flipping an image around to see it in reverse, rotating an image, swiveling an image with respect to an axis, copying an image, deleting an image from the stream, hiding an image in the stream, flagging an image in the stream, moving an image to a different stream, or editing captions, links, tags, metadata, properties, or special effects. In particular embodiments involving a multi-stream presentation, the viewer may be able to select and apply actions to multiple images in the stream at once.

Such controls may be provided by way of, by way of example and not limitation: touch gestures, a slider on a bar that can be moved to a particular position, control buttons or icons, command-line control commands, voice commands, or any other conventional input mechanism.

In particular embodiments, an image may be accompanied by captions, tags, a "Like" link, a link to add a comment, a link to tag someone/something, a link to flag the image as inappropriate/misclassified, etc. Contextual information regarding the scrolling presentation may be displayed with the images (e.g., timeline, d/s for search results, value/color representing coefficient value or degree of match with search query, music, background colors/images, or index numbers/indicators). Such accompanying content/features may be presented in different styles or orientations with respect to each image in the scrolling presentation. Accompanying content/features may be presented in audio and/or controlled via voice commands.

Figure 2:
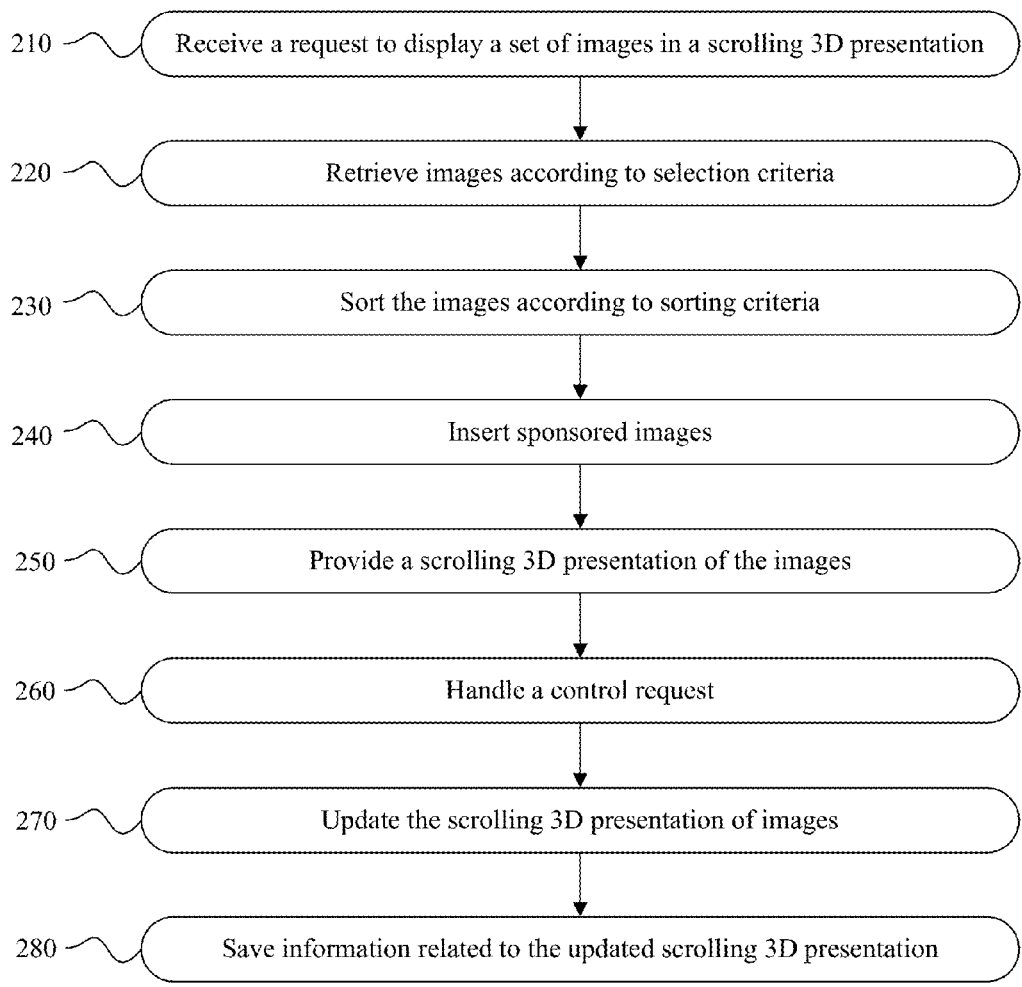
FIG. 2 is a flowchart of an example method for providing a scrolling 3D presentation of images.

FIG. 2 is a flowchart of an example method for processing combining-character sequences for display on client devices. The steps presented in FIG. 2 may be performed either by a client device, by one or more computer servers, or by a combination thereof. Examples of both client devices and computer servers are described in greater detail with respect to FIG. 5 and associated paragraphs in the specification.

In step 210, a request to display a set of images in a scrolling 3D presentation is received. In particular embodiments, the request may be entered by a user and received by a computing device. In particular embodiments, a client device may send a request to one or more computer servers. The request may comprise a request for, by way of example and not limitation: (1) images from one or more albums or collections, (2) image search results, (3) images from a social-networking system, (4) a set of captured images of online content selected according to user preferences, sponsored initiatives, or other factors, or (5) a random selection of images from one or more sources. These example categories are discussed in further detail with respect to step 220 below.

In step 220, images may be retrieved in accordance with selection criteria. In particular embodiments, retrieval of images may comprise retrieving or requesting images from one or more local data stores, from one or more remote data stores, from one or more databases, from one or more third-party servers, or by accessing one or more APIs.

In particular embodiments, retrieval of images may comprise generating screenshots, generating thumbnails, extracting video frames, cropping images, scaling images, converting images from one format to another (e.g., vector to raster, or Portable Networking Graphics (PNG) to Joint Photographic Experts Group (JPEG).

Images from one or more albums or collections. Each album or collection may comprise images that the viewer generated, provided, or has access to (e.g., publicly-available images or images for which the viewer has been granted viewing permissions by a user of a social-networking system to whom the viewer is connected).

Image search results may be retrieved in response to a search request. The image search results may be retrieved according to one or more search parameters in the search request. Search parameters may apply to the subject matter of the images, to content or metadata associated with the images, or to properties or attributes of the images. Results may be limited in scope in any manner, e.g., limited to the viewer's images, limited to images associated with the viewer, limited to images available on a social-networking system, or images that are generally electronically available. The viewer may be able to dismiss/hide particular images in a scrolling presentation (e.g., images that are not relevant search results, or images that are otherwise inappropriate or misclassified).

The set of images in the scrolling 3D presentation may include images from a social-networking system. Such images may include images associated with the viewer, images associated with other users connected to the viewer in a social graph (which may be limited to users connected to the viewer within a particular degree of separation, users within a particular group or organization, users sharing particular interests or affinities with the viewer, or users having a similar profile as the user or a target demographic profile) or images associated with particular users or concepts that the viewer is following. Example embodiments of a social graph are described in further detail with respect to FIG. 3. Example embodiments of a social-networking system are described in further detail with respect to FIG. 4.

The set of images in the scrolling 3D presentation may include a set of captured images of online content. In particular embodiments, an image may represent a screenshot of a website, a portion of a website, or a screenshot of some other type of online content. For example, images may include screenshots of current news stories for topics, companies, politicians, or celebrities that the user is following. Upon clicking on the image, the viewer may be taken to the website for the screenshot. Such captured images may be generated by a web crawler or received from third-party servers.

Images may be selected according to relevance to the user, user preferences, or other factors. In particular embodiments, images may be selected in accordance with social-networking information. A social-networking system may have determined a relevance score for an image based at least in part on a connection value for the image. As an example and not by way of limitation, a number of people depicted in the image who are associated with user nodes connected to the viewer in the social graph may affect the connection value. As an example and not by way of limitation, a degree of separation between user nodes of the social graph and the viewer may affect the connection value. As another example, the type of connection between the viewer and the user nodes of the social graph user may affect the connection value. As an example and not by way of limitation, "friendship"-type connections may be associated with a higher connection value than a "work colleague"-type connection.

A social-networking system may determine a relevance score for an image based at least in part on an interest value for the image. The interest value may be based at least in part on whether a category or categories assigned to the image coincide with the category or categories associated with the viewer's interests. The interest value may be based at least in part on whether a category or categories assigned to people, locations, objects, or actions depicted in the image coincide with the category or categories associated with the viewer's interests. The interest value may be based at least in part on whether a category or categories assigned to social-networking information, third-party information, or metadata associated with the image coincide with the category or categories associated with the viewer's interests.

As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 160, or visiting a website of a third party. As another example, third-party information may include information of activity of the user or purchases by the user on a third-party website.

Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

The relevance score may be based at least in part to an affinity for the user with respect to the object of the social graph, as described above. As an example and not by way of limitation, affinity for past, present, or future content may be determined by the processing module of the content engine based on user activities, activities of the user nodes of the social graph, or associated connections, or any combination thereof. Affinity may be calculated using a weighted set of predictor functions. Predictor functions predict whether the user will perform a particular action. The predictor functions may predict any number of actions, which may be within or outside of the social networking system. Any type of variable may be considered when determining affinity to weight the aggregated consolidated data. Determination and use of measures of affinity are discussed in further detail in the following U.S. patent applications, all of which are incorporated herein by reference: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

In particular embodiments, the set of images to be displayed in the scrolling 3D presentation may be cached on the client computing device on which they are to be displayed. In particular embodiments, the set of images to be displayed in the scrolling 3D presentation may be updated in real time, or they may be updated each time the scrolling 3D presentation is initiated. The updates may occur as new images become available or existing images are modified or deleted. For example, if the set of images is intended to encompass an online album of images, the scrolling 3D presentation may be updated as images are added to the album. In another example, if the set of images is intended to comprise search results, the scrolling 3D presentation may be updated as new results corresponding to the search request become available. In another example, if the set of images is intended to comprise images from a social-networking system that are uploaded by close friends (within one degree of separation in a social graph) and in which the viewer is tagged, the scrolling 3D presentation may be updated as those close friends add and/or tag images. In another example, if the set of images is intended to comprise captured screenshots of homepages of various news and other media websites, the scrolling 3D presentation may be updated as those homepages are updated.

In step 230, images may be sorted in accordance with sorting criteria. In particular embodiments, images in a scrolling 3D presentation of images may be sorted chronologically, according to properties of the images (e.g., size, resolution, color vs. black-and-white), by a ranking (e.g., according to a relevance score determined with respect to the viewer), by the subject matter of the images, according to metadata, content, properties, or attributes of the images, or in random order. In particular embodiments, one or more of the selection criteria discussed above with respect to step 220 may also be used to sort the images.

In step 240, sponsored images may be inserted into the scrolling 3D presentation. In particular embodiments, sponsored content (e.g., advertisements) or content deemed to be of "high interest" or content that is otherwise highly relevant to the user is interspersed with other images in a stream. In particular embodiments, the sponsored images may be associated with a sponsored story or advertisement.

Selection and/or placement of interspersed content into a stream of images may be based upon "dark tagging" of pre-existing images in the stream. Dark tagging may comprise associating tags or metadata with an image that are not visible to an end user. Such dark tags may be created by an administrator or another user. Such dark tags for an image may also be auto-generated based on, by way of example and not limitation, image analysis, identification of people, entities, products, locations, or other items in the image, detection of particular scenarios or actions depicted by the image, or metadata/attributes/properties associated with the image.

Sponsored initiatives may include marketing campaigns, advertising campaigns, political campaigns, and the like. For example, if Arnold Schwarzenegger were campaigning for the Governorship of California, his campaign committee might implement a sponsored initiative to promote images depicting him that were taken after the date of his announcement to run for the position. In another example, if a new movie titled "Pokemon vs. Itchy and Scratchy" were to be released in two weeks, the producer of the movie might, as part of a larger marketing campaign, set up a sponsored initiative to (1) insert trailers for the movie into scrolling 3D presentations for users who fall into a particular demographic category, or who belong to a fan club or group associated with either Pokemon or Itchy and Scratchy, or who have played online games related to Pokemon or to Itchy and Scratchy.

In connection with sponsored stories, particular embodiments may utilize one or more systems, components, elements, functions, methods, operations, or steps disclosed in U.S. patent application Ser. No. 13/653,057, entitled "Sponsored Stories in Notifications" and filed 16 Oct. 2012, U.S. patent application Ser. No. 13/327,557, entitled "Sponsored Stories Unit Creation from Organic Activity Stream" and filed 15 Dec. 2011, U.S. Patent Appln. Publ. No. US 2012/0203831, entitled "Sponsored Stories Unit Creation from Organic Activity Stream" and filed 3 Feb. 2012 as U.S. patent application Ser. No. 13/020,745, or U.S. Patent Appln. Publ. No. US 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation.

In step 250, the SN may provide a scrolling 3D presentation of the images. As described with respect to the examples illustrated in FIGS. 1A-E, images in the scrolling 3D presentation are presented in a scrolling 3D presentation with respect to the viewer's perspective as if moving through a virtual gallery. One or more streams of images "approach" the viewer, and the image "closest" to the viewer is displayed most clearly and prominently. The images may become continuously larger in scale, higher in resolution, and/or less obscured as they approach the viewer. Images may then correspondingly "retreat" from the user (becoming smaller, lower in resolution, and/or more obscured), as might be appropriate in FIG. 1E, or they may continue to "approach" the viewer but also veer off to the side and out of the screen or window, as might be appropriate in FIGS. 1A-D. Alternatively, or in addition, images may dissolve or otherwise disappear at some point (as they move beyond a designated field of visibility).

The viewer may be able to configure the scrolling 3D presentation to display the images on a repeated cycle, and/or to shuffle an order of the images prior to or as the images are being displayed. In particular embodiments, the viewer may be able to configure the scrolling 3D presentation to periodically or continuously vary the style of the scrolling 3D presentation, or background or special effects associated with the scrolling 3D presentation or images in the scrolling 3D presentation.

In step 260, a control request may be received and handled. The control request may comprise any command or functionality described above with respect to the user control interface. Particular types of control requests may be completely handled client-side. For example, if a viewer were to click on an image so as to cause the display to flip the image or to zoom in on the image, such an operation may be handled completely client-side. Other types may require both client- and server-side operations. For example, if a viewer were to add a tag to an image or modify their viewing preferences, particular information associated with the control request may be sent to a server. In another example, if a third party were to initiate a sponsored initiative to propagate a movie trailer prior to a weekend launch of new movie, a social-networking system might generate a control request to (1) send, to client computing devices associated with users falling within a target demographic group, an image related to the trailer and (2) insert the image into scrolling 3D presentations. In another example, if an administrator of a social-networking system were requested to remove an uploaded image that was in violation of a copyright, the social-networking system might generate a control request that removes copies of the image from any scrolling 3D presentations being displayed on client computing devices associated with users of the social-networking system.

In step 270, the SN may update the scrolling 3D presentation of the images. This update may occur if the control request affects the appearance of any images in the scrolling 3D presentation, changes the order or style in which the images may appear in the scrolling 3D presentation, or changes the selection of images that are to be presented in the scrolling 3D presentation.

In step 280, information related to the updated scrolling 3D presentation may be stored. In particular embodiments, such information may be related to preferences, configuration settings, metadata, attributes, and/or properties associated with one or more images, a stream, a scrolling 3D presentation, or generally with a particular user, a category of users, or a group of users, or generally with a particular computing device, a category of computing devices, or a group of computing devices. In particular embodiments, such information may be stored on a computing device associated with a user, or on one or more computer servers.

Figure 3:
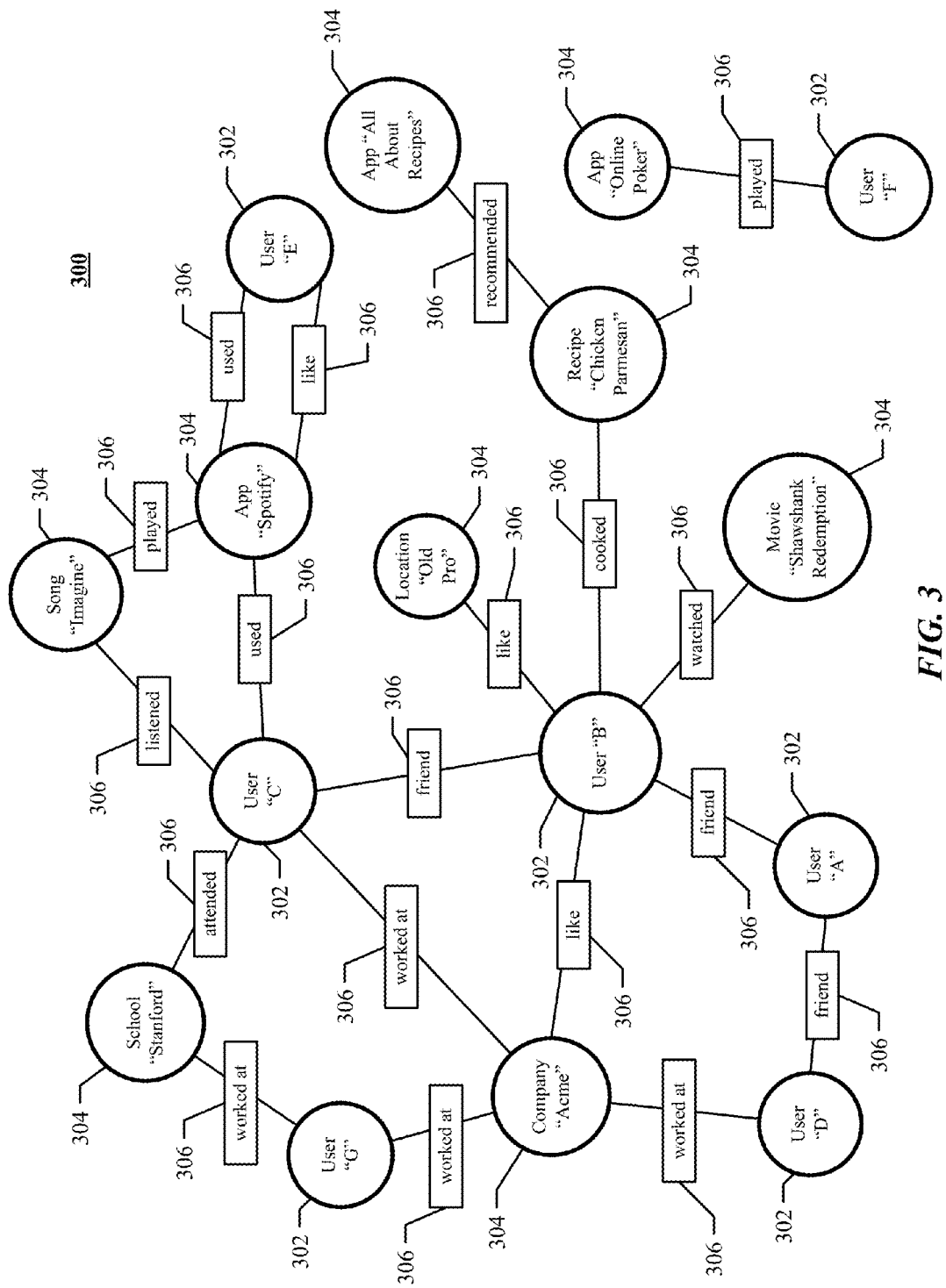
FIG. 3 is a block diagram of an example social graph.

FIG. 3 illustrates example social graph 300. In particular embodiments, social-networking system 460 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 460, client system 430, or third-party system 470 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 460. In particular embodiments, a user node 302 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages or one or more user-profile pages (which may be webpages).

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to a webpage.

In particular embodiments, a node in social graph 300 may represent or be represented by a webpage (which may be referred to as a "profile page"). Profile pages may be hosted by or accessible to social-networking system 460. Profile pages may also be hosted on third-party websites associated with a third-party server 470. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 430 to transmit to social-networking system 460 a message indicating the user's action. In response to the message, social-networking system 460 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 460 may transmit a "friend request" to the second user. If the second user confirms the "friend request," social-networking system 460 may create an edge 306 connecting the first user's user node 302 to the second user's user node 302 in social graph 300 and store edge 306 as social-graph information in one or more of data stores 24. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 460 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 460 may create an edge 306 between a user node 302 and a concept node 304 in social graph 300. As an example and not by way of limitation, a user viewing a concept-profile page (such as, for example, by using a web browser or a special-purpose application hosted by the user's client system 430) may indicate that he or she likes the concept represented by the concept node 304 by clicking or selecting a "Like" icon, which may cause the user's client system 430 to transmit to social-networking system 460 a message indicating the user's liking of the concept associated with the concept-profile page. In response to the message, social-networking system 460 may create an edge 306 between user node 302 associated with the user and concept node 304, as illustrated by "like" edge 306 between the user and concept node 304. In particular embodiments, social-networking system 460 may store an edge 306 in one or more data stores. In particular embodiments, an edge 306 may be automatically formed by social-networking system 460 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

Figure 4:
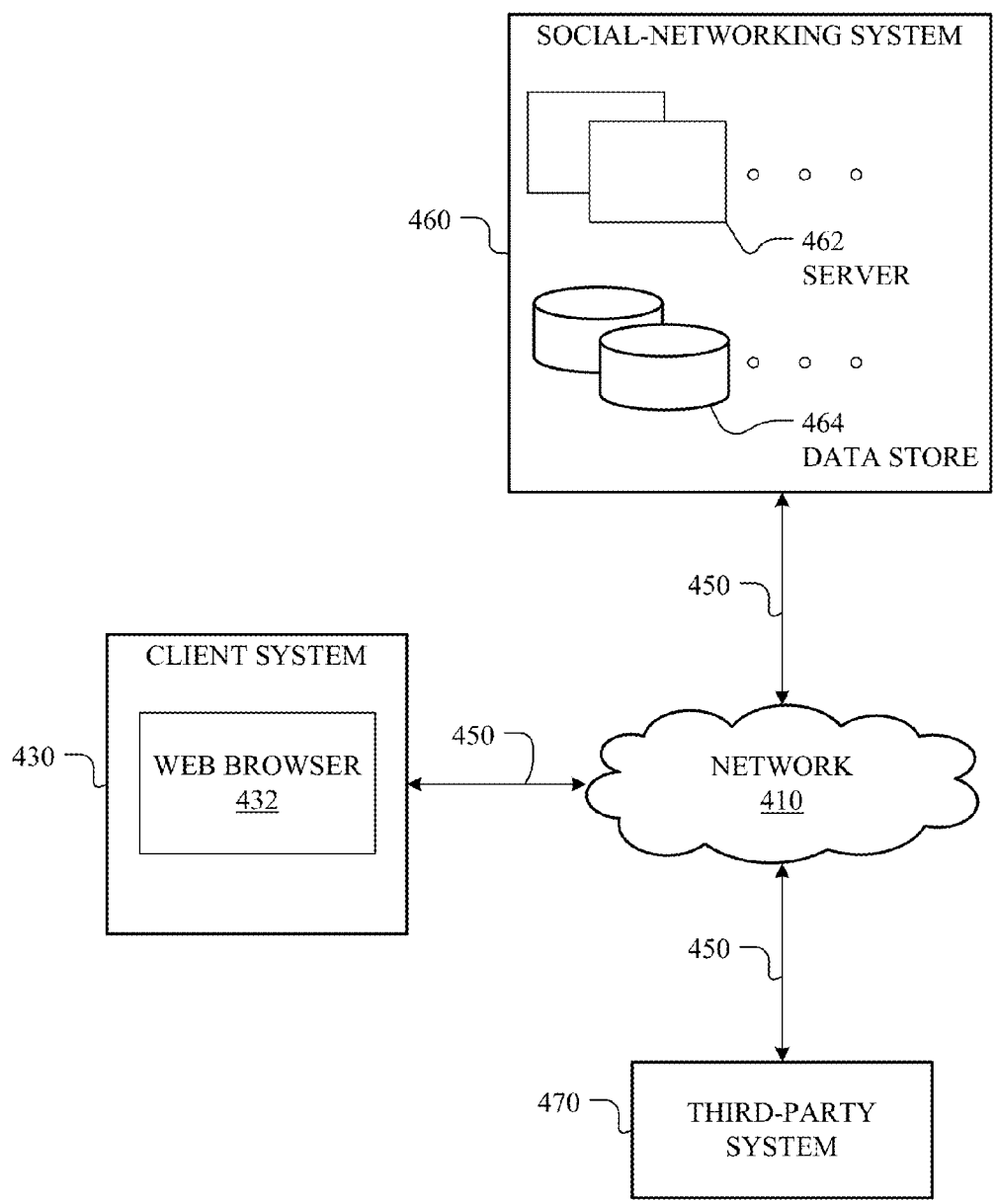
FIG. 4 is a block diagram of an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to the server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and transmit social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 464 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplate any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (i.e., relationships) to a number of other users of social-networking system 460 whom they want to be connected to. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Ad-pricing modules may combine social information, the current time, location information, or other suitable information to provide relevant advertisements, in the form of notifications, to a user.

Figure 5:
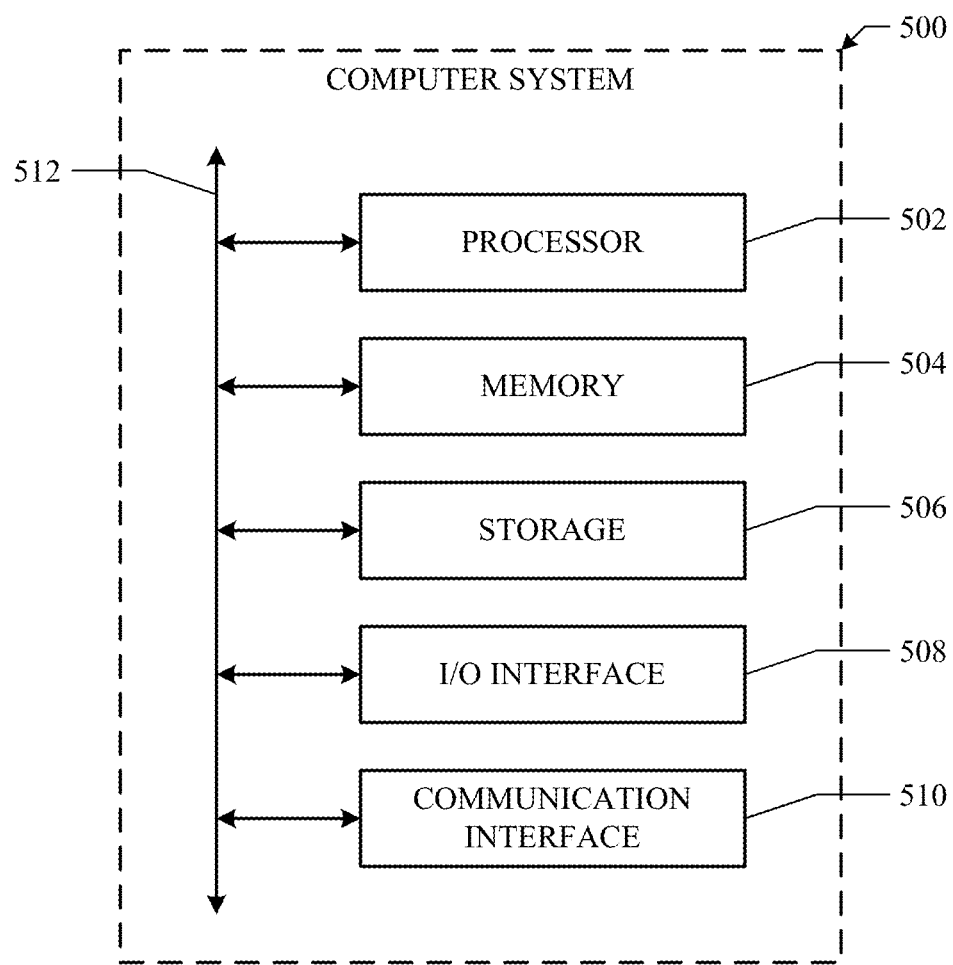
FIG. 5 is a block diagram of an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, I/O interface 508 may include additional hardware, software, or both to support one or more sensors to provide additional information, such as, for example and without limitation: a touch sensor (disposed, for example, on a display of the device, the back of the device and/or one or more lateral edges of the device) for detecting a user touching the surface of the mobile electronic device (e.g., using one or more fingers); an accelerometer for detecting whether the personal computing device 200 is moving and the speed of the movement; a thermometer for measuring the temperature change near the personal computing device 200; a proximity sensor for detecting the proximity of the personal computing device 200 to another object (e.g., a hand, desk, or other object); a light sensor for measuring the ambient light around the personal computing device 200; an imaging sensor (e.g., camera) for capturing digital still images and/or video of objects near the personal computing device 200 (e.g., scenes, people, bar codes, QR codes, etc.); a location sensor (e.g., Global Positioning System (GPS)) for determining the location (e.g., in terms of latitude and longitude) of the mobile electronic device; a sensor for detecting communication networks within close proximity (e.g., near field communication (NFC), Bluetooth, RFID, infrared); a chemical sensor; a biometric sensor for biometrics-based (e.g., fingerprint, palm vein pattern, hand geometry, iris/retina, DNA, face, voice, olfactory, sweat) authentication of a user; etc.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network, or an antenna. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, display of a scrolling 3D presentation may be based on FLASH, QUICKTIME, SILVERLIGHT, or any other browser plugin or client-side software appropriate for such operations. In particular embodiments, display of a scrolling 3D presentation may be based on WEBGL (a JAVASCRIPT API) or other software that enables use of hardware-accelerated graphics, thereby avoiding reliance upon FLASH or browser plugins.

In particular embodiments, a scrolling 3D presentation renders images so that the images smoothly or continuously appear to sequentially approach the viewer according to the viewer's perspective. In particular embodiments, a scrolling 3D presentation may be based upon real time rendering operations or based upon a plurality of pre-rendered animation sequences wherein an animation sequence for each image is rendered ahead of time.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more computing devices, receiving, from a client computing device associated with a user of a social-networking system, a search request for a plurality of images;
   by the one or more computing devices, receiving, from the client computing device, a request to display the plurality of images in a scrolling 3D presentation comprising two streams of images moving toward the user at the same time, wherein the plurality of images are associated with nodes of a social graph associated with the social-networking system, and wherein the user has been granted viewing permissions to view one or more of the plurality of images by another user of the social-networking system;
   by the one or more computing devices, retrieving the plurality of images according to selection criteria associated with the search request, wherein the selection criteria comprises selecting one or more images based on a social relevance to the user and one or more sponsored images based on an advertisement relevance to the user;
   by the one or more computing devices, applying an effect to one or more of the two streams of images based on social-networking information associated with the user; and
   by the one or more computing devices, providing the scrolling 3D presentation comprising the two streams of images for display on the client computing device associated with a viewer,
   wherein the plurality of images in the scrolling 3D presentation are rendered so as to sequentially approach the viewer according to a perspective of the viewer, and
   wherein at least one of the plurality of images is displayed as a cropped portion at a first position while moving toward the user in the scrolling 3D presentation until the cropped-portion image is closer to the viewer at a second position to be displayed in full.

2. The method of claim 1, further comprising: inserting sponsored images into the scrolling 3D presentation.

3. The method of claim 1, further comprising: sorting the plurality of images in the scrolling 3D presentation.

4. The method of claim 1, further comprising: providing a control interface for the viewer to submit control requests related to the scrolling 3D presentation.

5. The method of claim 4, further comprising:
   handling the control request related to the scrolling 3D presentation; and
   updating the scrolling 3D presentation.

6. The method of claim 5, wherein the control request is received from the viewer, from a social-networking system, or from a third-party server.

7. The method of claim 4, further comprising: saving information related to the updated scrolling 3D presentation.

8. The method of claim 1, wherein the request to display the plurality of images comprises a search request, and wherein the search request includes parameters comprising the selection criteria.

9. The method of claim 1, wherein the plurality of images in the scrolling 3D presentation are pre-rendered.

10. The method of claim 1, wherein the plurality of images in the scrolling 3D presentation are rendered in real time.

11. The method of claim 1, wherein the plurality of images in the scrolling 3D presentation comprise hardware-accelerated graphics.

12. The method of claim 1, wherein the selection criteria are based on social-networking information associated with the viewer, the viewer being associated with a user in a social-networking system.

13. The method of claim 1, wherein the scrolling 3D presentation is updated in real time to include new images, remove images, or update existing images.

14. The method of claim 1, wherein the plurality of images in the scrolling 3D presentation are cached on the computing device associated with the viewer.

15. One or more computer-readable non-transitory storage media embodying software that is operable when executed to:
   by one or more computing devices, receive a search request for a plurality of images;
   by the one or more computing devices, receive a request to display the plurality of images in a scrolling 3D presentation comprising two streams of images moving toward the user at the same time, wherein the plurality of images are associated with nodes of a social graph associated with the social-networking system, and wherein the user has been granted viewing permissions to view one or more of the plurality of images by another user of the social-networking system;
   by the one or more computing devices, retrieve the plurality of images according to selection criteria associated with the search request, wherein the selection criteria comprises selecting one or more images based on a social relevance to the user and one or more sponsored images based on an advertisement relevance to the user;
   by the one or more computing devices, apply an effect to one or more of the two streams of images based on social-networking information associated with user; and by the one or more computing devices, provide the scrolling 3D presentation comprising the two streams of images for display on the computing device associated with a viewer, wherein the plurality of images in the scrolling 3D presentation are rendered so as to sequentially approach the viewer according to a perspective of the viewer, and wherein at least one of the plurality of images is displayed as a cropped portion at a first position while moving toward the user in the scrolling 3D presentation until the cropped-portion image is closer to the viewer at a second position to be displayed in full.

16. The media of claim 15, the software being further operable when executed to:

insert sponsored images into the scrolling 3D presentation.

17. The media of claim 15, the software being further operable when executed to:

sort the plurality of images in the scrolling 3D presentation.

18. A client computing device associated with a user, comprising:

one or more processors; and a memory coupled to the processors comprising instructions executable by the processors, the processors operable when executing the instructions to:

receive a search request for a plurality of images;

receive a request to display the plurality of images in a scrolling 3D presentation comprising two streams of images moving toward the user at the same time, wherein the plurality of images are associated with nodes of a social graph associated with the social-networking system, and wherein the user has been granted viewing permissions to view one or more of the plurality of images by another user of the social-networking system;

retrieve the plurality of images according to selection criteria associated with the search request, wherein the selection criteria comprises selecting one or more images based on a social relevance to the user and one or more sponsored images based on an advertisement relevance to the user;

apply an effect to one or more of the two streams of images based on social-networking information associated with the user; and provide the scrolling 3D presentation comprising the two streams of images for display on the computing device associated with a viewer, wherein the plurality of images in the scrolling 3D presentation are rendered so as to sequentially approach the viewer according to a perspective of the viewer, and wherein at least one of the plurality of images is displayed as a cropped portion at a first position while moving toward the user in the scrolling 3D presentation until the cropped-portion image is closer to the viewer at a second position to be displayed in full.

19. The device of claim 18, the processors being further operable when executing the instructions to:

provide a control interface for the viewer to submit control requests related to the scrolling 3D presentation.

20. The device of claim 19, the processors being further operable when executing the instructions to:

handle a control request related to the scrolling 3D presentation; and update the scrolling 3D presentation.

* * * * *